United States Patent
Kawazu et al.

[11] 4,205,349
[45] May 27, 1980

[54] OPTOELECTRONIC SCANNING APPARATUS

[75] Inventors: Motoaki Kawazu; Takashi Yokota; Toshiyuki Inokuchi; Yoshiaki Kanmoto, all of Tokyo, Japan

[73] Assignee: Ricoh Company, Ltd., Tokyo, Japan

[21] Appl. No.: 899,245

[22] Filed: Apr. 24, 1978

[30] Foreign Application Priority Data

May 7, 1977 [JP] Japan ............................... 52-51759

[51] Int. Cl.² ............................................. H04N 1/02
[52] U.S. Cl. .................................................... 358/294
[58] Field of Search ...................... 358/294, 285, 293

[56] References Cited

U.S. PATENT DOCUMENTS

| 3,466,451 | 9/1969 | Hanchett, Jr. | 358/294 |
| 3,887,765 | 6/1975 | Murahse et al. | 358/285 |

*Primary Examiner*—Robert L. Griffin
*Assistant Examiner*—Joseph A. Orsino, Jr.
*Attorney, Agent, or Firm*—David G. Alexander

[57] ABSTRACT

An original document for facsmile transmission or the like is fed over a horizontal transparent platen by rollers for scanning. A light source illuminates the document and a mirror reflects a light image of a linear portion of the document perpendicular to the direction of movement horizontally to a converging lens. The light image from the lens is reflected upwardly by another mirror onto the light receiving surface of a linear photosensor array. The light receiving surface of the array faces downwardly, minimizing accumulation of dust thereon. A light baffle in the form of a box is provided between the first mirror and converging lens and is formed with apertures for the light image to pass therethrough. A scan drive and amplifier circuit for the array is mounted closely adjacent thereto while a signal processing circuit comprising a quantization means is mounted on the box and electrically connected to the drive unit. The various units of the apparatus are individually detachable for ease of servicing. The arrangement of the various units prevents heat and stray light from the light source from reaching and affecting the array.

5 Claims, 8 Drawing Figures

OPTOELECTRONIC SCANNING APPARATUS

BACKGROUND OF THE INVENTION

The present invention relates to an optoelectronic scanning apparatus for a facsimile transceiver or the like.

An apparatus of this general type which is known in the art comprises a horizontal transparent glass platen over which an original document is scanningly fed by rollers or the like. A converging lens focusses a light image of a linear portion of the document perpendicular to the direction of movement onto a linear photosensor array located below the platen. A drive unit sequentially strobes the individual elements of the array to produce output signals corresponding to incident light intensity. A signal processing unit quantizes the signals to produce binary signals corresponding to light and dark areas of the document. The binary signals are fed to a remote facsimile transceiver to reproduce the document.

A major drawback of the prior art apparatus is that the photosensor array is disposed below the platen and faces upwardly. Thus, dust accumulates on the light receiving surface of the array due to the gravity. The dust partially obscures the photosensor elements and affects the quantization level in an uneven manner. Also, stray light and heat from a lamp used to illuminate the document reach the array and adversely affect the operation thereof. As yet another drawback, the vertical arrangement of the apparatus elements necessitates an undesirably large overall vertical size, and makes servicing of the elements awkward and difficult.

SUMMARY OF THE INVENTION

An illumination unit comprises a horizontal glass platen over which an original document is scanningly fed. A mirror disposed below the platen refects a light image of a linear portion of the document to a reading unit which is horizontally spaced from the illumination unit. The reading unit comprises a converging lens having a substantially horizontal optical axis, a photosensor array having a light receiving surface facing substantially downwardly and a second mirror disposed below the array for reflecting the light image from the lens upwardly onto the light receiving surface of the array. A box which serves as a light baffle is disposed between the illumination and reading units and is formed with apertures through which the light image passes. The box bifunctions as a support for a signal processing unit associated with the photosensor array.

It is an object of the present invention to provide an optoelectronic scanning apparatus for a facsimile transceiver or the like which minimizes accumulation of dust and the accompanying adverse effects thereof on a photosensor array.

It is another object of the present invention to provide an optoelectronic scanning apparatus which minimizes the adverse effects of heat and stray light from an illumination lamp on a photosensor array.

It is another object of the present invention to provide an optoelectronic scanning apparatus of more compact vertical size than the prior art.

It is another object of the present invenion to provide an optoelectronic scanning apparatus comprising various units which are individually detachable and more easily serviced than corresponding prior art units.

It is another object of the present invention to provide a generally improved optoelectronic scanning apparatus for a facsimile transceiver or the like.

Other objects, together with the foregoing, are attained in the embodiments described in the following description and illustrated in the accompanying drawing.

DESCRIPTION OF THE PREFERRED EMBODIMENTS

While the optoelectronic scanning apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
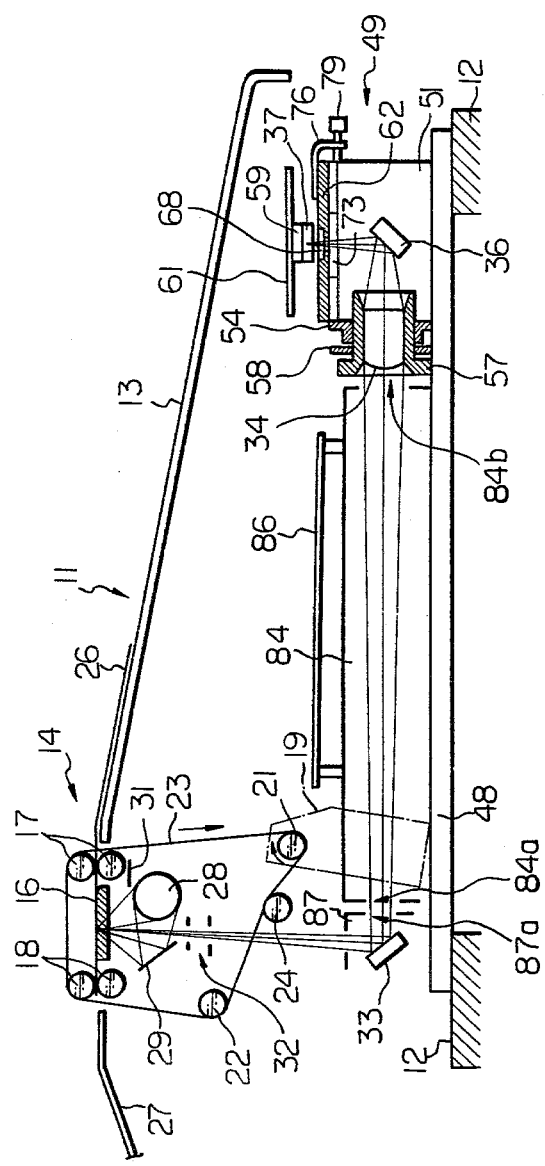
FIG. 1 is a sectional side elevation of an optoelectronic scanning apparatus embodying the present invention.

Referring now to FIG. 1 of the drawing, an optoelectronic scanning apparatus embodying the present invention is generally designated by the reference numeral 11 and comprises a housing 12 having a detachable cover 13. An illumination unit 14 is detachably mounted to the housing 12 and comprises a horizontal, transparent glass platen 16. A pair of inlet feed rollers 17 and a pair of outlet feed rollers 18 are located on the right and left sides of the platen 16 respectively. The upper ones of the feed rollers 17 and 18 are rotatably driven from a motor 19 in the clockwise direction by means of a drive belt 23 and pulleys 21 and 22. Further illustrated is a tension pulley 24 for the drive belt 23. An original document 26 for facsimile transmission or the like is placed on the cover 26 and slidably inserted into the bite of the feed rollers 17. The feed rollers 17 and 18 feed the document 26 leftwardly across the platen 16 at a predetermined speed and ultimately discharge the document 26 into a tray 27.

The document 26 is placed face down on the cover 13 and fed in this manner over the platen 16. A lamp 28 illuminates the document 26 from below, through the platen 16. A portion of the light from the lamp 28 illuminates the document 26 directly. Another portion of the light from the lamp 26 is reflected from a reflector 29 onto the document 26. Further illustrated is a shading compensation plate 31 for equalizing the intensity of illumination of the direct light component.

A light image of a linear portion of the document 26 perpendicular to the direction of movement thereof (the light image extends perpendicular to the plane of the drawing) passes through a slit 32 and is incident on a reflector in the form of a plane mirror 33. From the mirror 33, the light image is reflected horizontally into a converging lens 34. The light image from the lens 34 is reflected upwardly by another mirror 36 onto the light receiving surface of a photosensor array 37.

Figure 8:
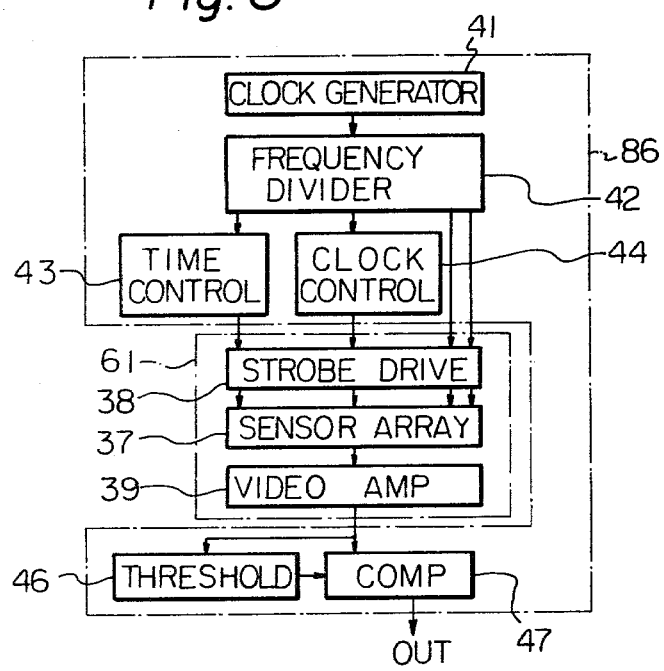
FIG. 8 is a block diagram of electrical components of the present apparatus.

Although not illustrated in detail, the array 37 comprises a plurality of photosensor elements which are arranged in a row perpendicular to the plane of the drawing coextensively with the light image. Referring also to FIG. 8, circuitry associated with the array 37 comprises a strobe drive unit 38 for sequentially strobing or enabling the individual photosensor elements of the array 37 and a video amplifier 39 for amplifying the output signals of the array 37. A clock pulse generator 41 generates a train of clock pulses which are frequency divided by a frequency divider 42 to produce strobe pulses for the strobe drive unit 38 and pulses of various frequencies for timing control. Further illustrated are a time control unit 43 for controlling the sequence of operation of the apparatus 11 and a clock control unit 44 for gating the strobe pulses to the strobe drive unit 38 at the proper timing.

The strobe drive unit 38 sequentially strobes the photosensor elements from one end of the array 37 to the other, thereby scanning the light image and the corresponding linear portion of the document 26. The outputs of the photosensor elements vary in amplitude depending on the intensity of incident light. The output of the video amplifier 39 is applied to a threshold unit 46 and a comparator 47 which constitute a quantization means (not designated). The analog output signals of the video amplifier 39 are compared with a threshold signal level of the threshold unit 46 by the comparator 47 to produce binary output signals. Where the output signal of one of the photosensor elements is above the threshold level, the comparator 47 will produce an output signal of a first level. Where the output signal of the photosensor element is below the threshold level, the comparator 47 will produce an output signal of second level. The binary output signals of the comparator 47 represent light and dark areas of the light image respectively.

The output of the comparator 47 constitutes an output of the apparatus 11 and is typically transmitted to a remote facsimile transceiver (not shown) which reproduces the document 26 in response to the binary signals.

It will be understood that scanning of the document 26 in one direction is accomplished by feeding the document 26 over the platen 16. Scanning of the document 26 in a second direction perpendicular to the first direction is accomplished by sequential strobing of the photosensor elements. The array 37 is strobed may times during transport of the document 26 over the platen 16, thus dividing the document 26 into a corresponding number of closely adjacent scan lines which are spaced from each other in the direction of movement of the document 26.

Referring again to FIG. 1, it will be seen that the illumination unit 14 is mounted on a base plate 48 which is in turn mounted to the housing 12. The lens 34, mirror 36 and array 37 are part of a reading unit 49 which is also detachably mounted on the base plate 48.

Figure 2:
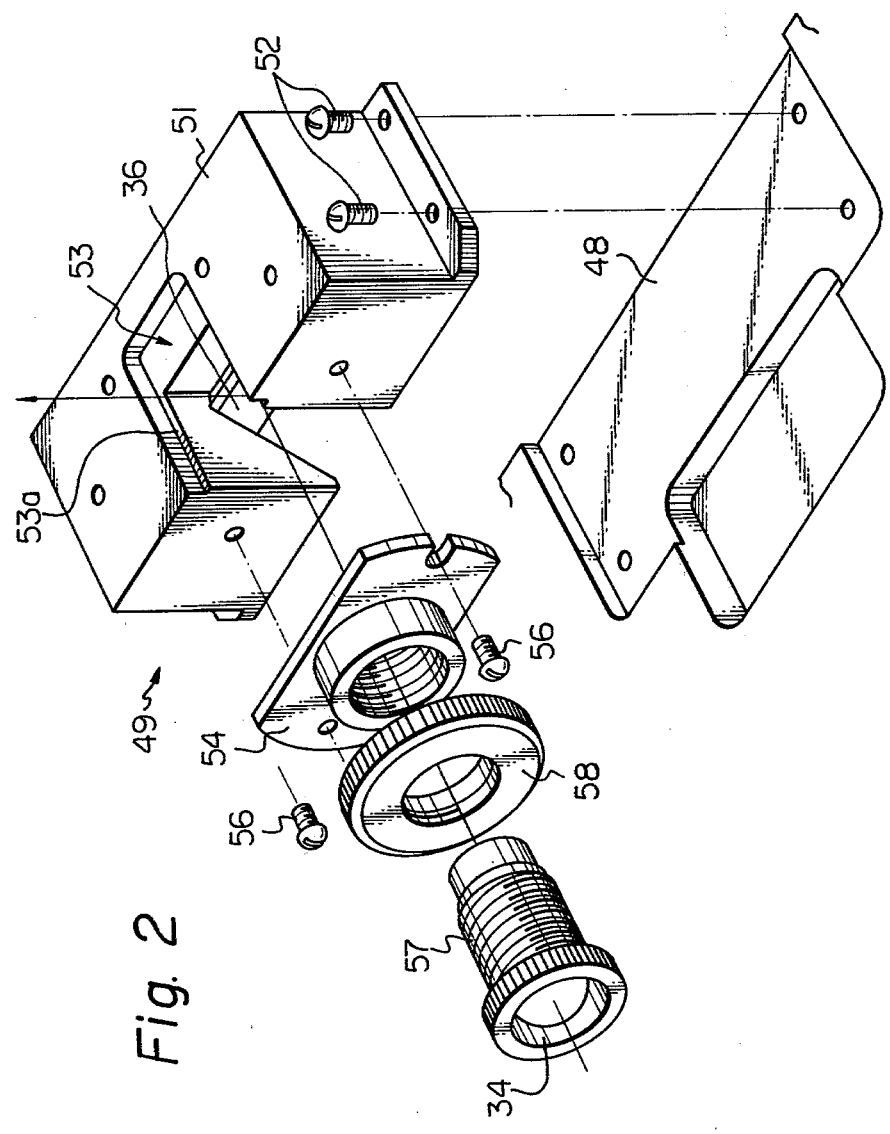
FIG. 2 is an exploded perspective view of part of a reading unit of the present apparatus.
Figure 3:
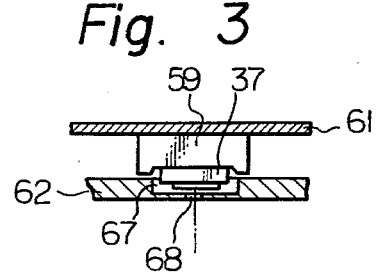
FIG. 3 is an enlarged sectional view of a photosensor array and mounting means therefor.

As best seen in FIG. 2, the reading unit 49 comprises a housing 51 which is attached to the base plate 48 by bolts 52. A recess 53 is formed in the housing 51 in which the mirror 36 is securely fixed at the proper angle. A lens mounting flange 54 formed with internal threads is secured to the housing 51 by bolts 56. The lens 34 is mounted in a lens tube 57 provided with external threads conjugate to the threads of the flange 54. The lens tube 57 is screwed into the flange 54 to the desired distance and locked in place by means of a lock ring 58. The lens tube 57 allows the lens 34 to be adjustably moved along its horizontal optical axis to focus the light image exactly on the array 37.

Figure 4:
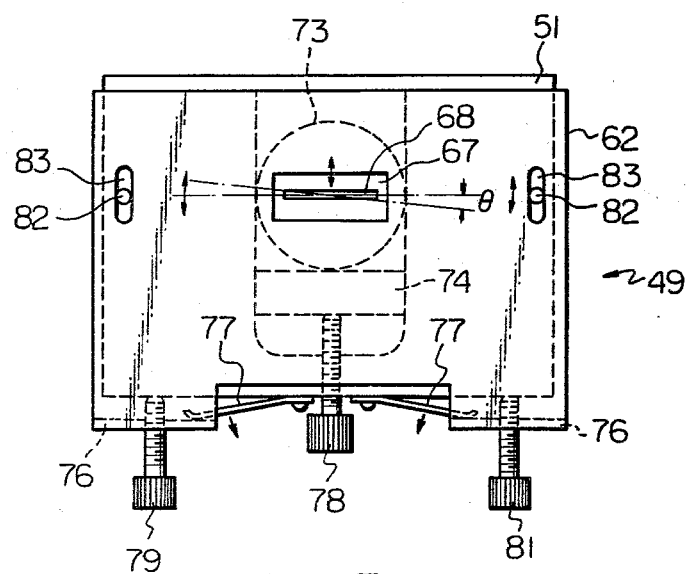
FIG. 4 is an overhead view of the present reading unit.
Figure 5:
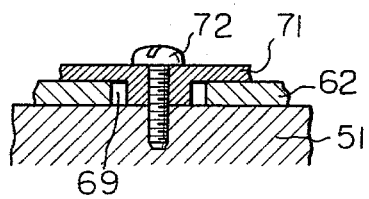
FIG. 5 is an enlarged sectional view of an adjustment means of the present reading unit.
Figure 6:
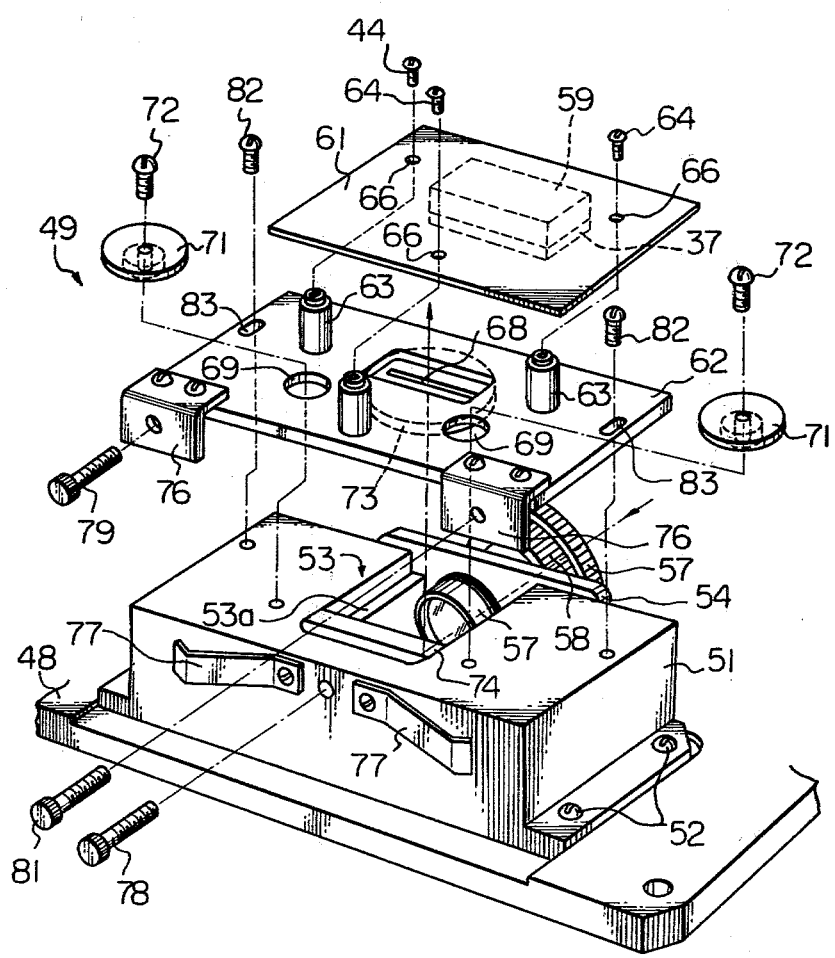
FIG. 6 is an exploded perspective view of the entire reading unit from another angle.

Referring also to FIGS. 4 to 6, it will be seen that the array 37 is mounted to a socket 59 which is in turn fixed to a circuit board 61. The circuit board 61 is mounted on a table 62 by means of spacers 63 extending upwardly from the table 62 and bolts 64 which extend through holes 66 in the circuit board 61 to securely screw into the spacers 63. The spacers 63 mount the circuit board 61 and thereby the array 37 exactly parallel to the table 62. To minimize the accumulation of dust on the lower (light receiving) surface of the array 37, the table 62 is formed with a recess 67 into which the lower portion of the array 37 fits. A slit 68 is formed through the recess 67 to allow the light image to reach the array 37.

The table is formed with enlarged holes 69 therethrough. As best seen in FIG. 5, the table 62 is slidable on the upper surface of the housing 51 and spacers 71 extend through the holes 69 into engagement with the housing 51. The spacers 71 are secured to the housing 51 by means of bolts 72. It will be noted that the diameter of the lower portions of the spacers 71 is smaller than the diameter of the holes 69. Furthermore, the height of the lower portions of the spacers 71 is just equal to the thickness of the table 62. This arrangement prevents the table 62 from being vertically detached from the housing 51 but allows the table 62 to be transversely slid relative to the housing 51 within a range corresponding to the difference in diameters between the lower portions of the spacers 71 and the holes 69.

The recess 53 is formed on both sides thereof with a ledge 53a. A circular disc 73 through which the slit 68 extends is integrally provided to the lower surface of the table 62. The diameter of the disc 73 just equals the distance between the opposite walls of the recess 53 above the ledges 53a, and the disc 73 snugly fits between said walls. A slider 74 having a length just equal to the diameter of the disc 73 is slidably supported between said walls or the ledges 53a.

The table 62 is provided with downwardly extending brackets 76. Leaf springs 77 fixed to the housing 51 engage and urge the brackets 76 and thereby the table 62 away from the housing 51, or downwardly as viewed in FIG. 4. An adjustment bolt 78 threadably extends through the housing 51 for engagment with the slider 74. With the bolt 78 screwed into the housing 51 to such an extent that the springs 77 are flexed, the disc 73 engages with and causes the slider 74 to engage the end of the bolt 78. From such a position, if the bolt 78 is screwed further into the housing 51, the table 62 is moved through the slider 74 and disc 73 upwardly as viewed in FIG. 4 relative to the housing 51. If the bolt 78 is screwed further out of the housing 51, the springs 77 move the table 62 downwardly as viewed in FIG. 4 through the brackets 76 until the disc 73, slider 74 and the end of the bolt 78 are again in abutting engagement. The bolt 78 allows the table 62 and thereby the array 37 to moved parallel to the optical axis of the lens 34, to precisely align the light image on the array 37.

Further illustrated are adjustment bolts 79 and 81 which threadably extend through the respective brackets 76 to engage the facing wall of the housing 51. The table 62 may be rotated relative to the housing 51 by screwing in one of the bolts 79 and 81 and unscrewing the other of the bolts 79 and 81 by the same amount. This causes the table 62 to rotate about the center of the disc 73. It will be understood that the axial position of the array 37 is adjusted by the bolt 78 whereas the angular position of the array 37 is adjusted by means of the bolts 79 and 81. The bolts 79 and 81 allow the light image to be aligned exactly on the array 37 in the angular direction.

Further illustrated are bolts 82 which extend through slots 83 formed through the table 62 into threading engagement with the housing 51. After the position of the table 62 is properly adjusted, the bolts 82 are tightened to securely clamp the table 62 to the housing 51. The slots 83 are sufficiently larger than the bolts 82 to allow the table 62 to rotate through an angle $\theta$ when the bolts 82 are loosened.

Referring again to FIG. 1, a light baffle box 84 is provided between the illumination unit 14 and reading unit 49. The box 84 is formed with apertures 84a and 84b through which the light image passes. Further visible in the drawing is an aperture 87a formed through a housing 87 of the illumination unit 87 adjacent to the mirror 33. Another circuit board 86 is mounted on the upper surface of the box 84.

Referring again to FIG. 8, it will be seen that the sensor array 37, the strobe drive unit 38 which generally constitutes a control circuit and the video amplifier 39 are mounted on the circuit board 61. Since the inputs and outputs of the photosensor array 37 are highly sensitive to signal degeneration caused by noise and attenuation, the wiring between the array 37 and the strobe drive unit 38 and video amplifier 39 must be as short as possible. For this reason, these units are mounted close together on the circuit board 61 with the wiring preferably shielded. However, the connections between the elements on the circuit board 61 and the other elements of FIG. 8, which generally constitute a signal processor unit, are not so critical. For this reason, they may be mounted remotely from the array 37 on the circuit board 86 without any problem.

Figure 7:
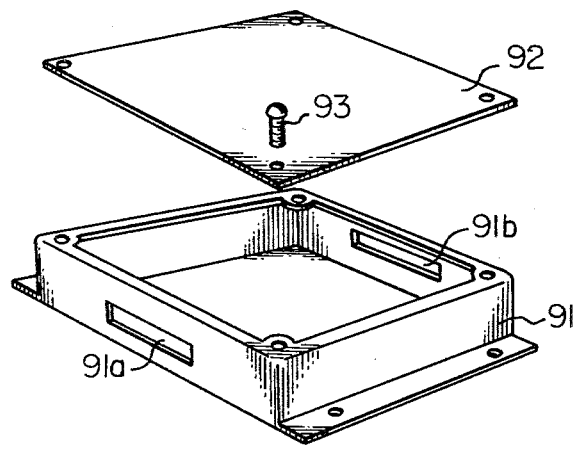
FIG. 7 is an exploded perspective view of a modified baffle box of the present apparatus.

FIG. 7 illustrates a modified form of the box, here designated as 91, which is formed with apertures 91a and 91b for passage of the light image. Differing from the box 84, the box 91 is provided with a detachable lid 92 which is mounted by means of bolts 93. Within the scope of the present invention, the lid 93 may be constituted by the circuit board 86.

From the above description, it will be understood that the present apparatus 11 overcomes all of the above mentioned drawbacks of the prior art. Since the light receiving surface of the array 37 faces downwardly, the accumulation of dust thereon is reduced to negligible proportions. The array 37 is protected from stray light and heat from the lamp 28 by the unique arrangement of the transversely spaced illumination and reading units 14 and 49 respectively and the box 84 which is provided as a light baffle therebetween.

The overall vertical size of the apparatus 11 is minimized by means of the mirrors 33 and 26 which serve to reverse the optical path of the light image. Thus, the present apparatus 11 can be made very thin in vertical dimension and accommodated on an ordinary office desk or table.

Whereas the circuit board 61 and thereby the reading unit 49 would have to be disproportionately large if all of the electronic components of the apparatus 11 were mounted on the circuit board 61, the size is reduced considerably by mounting the non-critical electrical components on the box 84. Thus, the box 84 bifunctions as a light baffle and a mount for the circuit board 86.

As yet another advantage of the present invention, the various units of the apparatus 11 are conviently mounted in an accessible and detachable manner. Thus, all units may be accessed and serviced merely by removing the cover 13.

Various modifications will become possible for those skilled in the art after receiving the teachings of the present disclosure without departing from the scope thereof.

What is claimed is:
1. An optoelectronic scanning apparatus comprising:
an illumination unit for illuminating an original document; and
a reading unit horizontally spaced from the illumination unit and including a converging lens having a substantially horizontal optical axis, a photosensor array having a light receiving surface facing substantially downwardly and a reflector disposed below the array for reflecting a light image of the document from the lens upwardly onto the light receiving surface of the array;
the reading unit comprising a reading unit housing having an upper surface formed with an elongated recess, a table slidable on said upper surface and being formed with a circular downwardly extending disc which snugly fits in the recess, the photosensor array being mounted on the table coaxially with the disc, the disc being rotatable about a center thereof and slidable in the recess for varying a transverse position of the table and thereby the array, and clamp means for clamping the table to the reading unit housing in a desired transverse position.

2. An apparatus as in claim 1, in which the reading unit further comprises an adjustable axial stop mounted on the reading unit housing and extending in parallel orientation to a variable extent into the recess and biasing means urging the disc into abutment with the axial stop.

3. An apparatus as in claim 2, further comprising a rectangular slider which snugly fits in the recess and is disposed between the disc and the stop.

4. An apparatus as in claim 2, further comprising first and second adjustable rotation stops mounted on the table spaced on opposite sides of the axial stop and extending parallel thereto a variable extent, the rotation stops being movable into engagement with an upstanding surface of the reading unit housing.

5. An optoelectronic scanning apparatus comprising:
an illumination unit for illumination an original document;
a reading unit horizontally spaced from the illumination unit and including a converging lens having a substantially horizontal optical axis, a photosensor array having a light receiving surface facing substantially downwardly and a reflector disposed below the array for reflecting a light image of the document from the lens upwardly onto the light receiving surface of the array;
the array comprising a plurality of photosensor elements arranged in a row, the illumination unit comprising drive means for scanningly moving the document relative to the lens, the light image being of a linear portion of the document;

a main housing, the illumination unit and reading unit being detachably mounted on the main housing;

a box disposed between the illumination unit and the reading unit, the box being formed with apertures through which the light image passes;

the illumination unit comprising a horizontal transparent platen for supporting the document and a reflector disposed below the platen for reflecting the light image horizontally through the box to the lens;

a photosensor control unit mounted on the reading unit closely adjacent and electrically connected to the array and a signal processing unit mounted on the box and being electrically connected to the control unit;

the control unit including strobe means for sequentially strobing the elements and amplifier means for amplifying output signals of the elements;

the signal processing unit comprising quantization means;

the reading unit comprising a reading unit housing having an upper surface formed with an elongated recess, a table slidable on said upper surface and being formed with a circular downwardly extending disc which snugly fits in the recess, the photosensor array being mounted on the table coaxially with the disc, the disc being rotatable about a center thereof and slidable in the recess for varying a transverse position of the table and thereby the array, and clamp means for clamping the table to the reading unit housing in a desired transverse position.

* * * * *